(12) United States Patent
Kasai

(10) Patent No.: US 7,679,664 B2
(45) Date of Patent: Mar. 16, 2010

(54) IMAGE PICKUP DEVICE

(75) Inventor: Masanori Kasai, Kanagawa (JP)

(73) Assignee: Sony Corporation, Tokyo (JP)

( * ) Notice: Subject to any disclaimer, the term of this patent is extended or adjusted under 35 U.S.C. 154(b) by 673 days.

(21) Appl. No.: 11/276,654

(22) Filed: Mar. 9, 2006

(65) Prior Publication Data

US 2006/0203123 A1 Sep. 14, 2006

(30) Foreign Application Priority Data

Mar. 9, 2005 (JP) ............................ P2005-065602

(51) Int. Cl.
*H04N 3/14* (2006.01)
*H04N 5/335* (2006.01)
(52) U.S. Cl. .................... 348/302; 250/208.1; 348/372
(58) Field of Classification Search ............ 348/207.99, 348/230.1, 241, 308, 372, 302; 250/208.1
See application file for complete search history.

(56) References Cited

U.S. PATENT DOCUMENTS

| 7,304,674 | B2 * | 12/2007 | Mentzer et al. | ............. 348/300 |
| 2002/0158982 | A1 * | 10/2002 | Kokubun et al. | ............ 348/308 |
| 2004/0246354 | A1 * | 12/2004 | Yang et al. | ................... 348/308 |
| 2005/0041129 | A1 * | 2/2005 | Kim et al. | .................... 348/308 |
| 2006/0044414 | A1 * | 3/2006 | Lee et al. | ................. 348/230.1 |
| 2006/0227226 | A1 * | 10/2006 | Olsen | ......................... 348/241 |
| 2006/0256220 | A1 * | 11/2006 | Rysinski et al. | ............. 348/308 |
| 2006/0278809 | A1 * | 12/2006 | Takayanagi | .............. 250/208.1 |

* cited by examiner

*Primary Examiner*—Lin Ye
*Assistant Examiner*—Dennis Hogue
(74) *Attorney, Agent, or Firm*—Sonnenschein Nath & Rosenthal LLP

(57) ABSTRACT

Vertical signal lines are connected to each pixel column in an image pickup unit having pixels arranged in arrays, and the vertical signal lines are connected to a voltage supply circuit for supplying a voltage between a power source voltage and a reference voltage.

12 Claims, 15 Drawing Sheets

Prior Art

FIG. 2A TRS
FIG. 2B RST
FIG. 2C SEL
FIG. 2D FD
FIG. 2E VERTICAL SIGNAL LINE

FIG. 6A S12
FIG. 6B S13
FIG. 6C OUTPUT SIGNAL LINE $((Vdd-Vt)+Vss)/2 \Rightarrow 1/2*(Vdd-Vt)$

IMAGE PICKUP DEVICE

CROSS REFERENCES TO RELATED APPLICATIONS

The present invention contains subject matter related to Japanese Patent Application No. 2005-065602 filed in the Japanese Patent Office on Mar. 9, 2005, the entire contents of which being incorporated herein by reference.

BACKGROUND OF THE INVENTION

1. Field of the Invention

The present invention relates to an image pickup device, wherein an output signal line is connected to each pixel array in an image pickup unit having pixels arranged in arrays, and a camera device including the image pickup device.

2. Description of the Related Art

As a typical image pickup device, wherein an output signal line is connected to each pixel array in an image pickup unit, for outputting a video signal generated by the pixels through the output signal line, a CMOS sensor is known (for example, refer to The Japanese Unexamined Patent Publication No. 2003-087662: the patent article 1).

FIG. 1 shows a pixel circuit of a CMOS sensor explained as the related art.

FIG. 1 shows a view of the configuration of outputting as a video signal charges (electrons) accumulated in a photodiode 100 to an output signal line 120. At this time, one side of the output signal line is connected to a sample hold circuit (S/H) and a correlation duplicate sample circuit (CDS) composing a column processing circuit, so that it has high impedance. Also, the other side of the output signal line 120 is connected to a current source 140 outside of the image pickup unit.

Each pixel of the CMOS sensor is provided with a photodiode (hereinafter, referred to as PD) 100 and four MOS transistors 200, 220, 240 and 260. Among them, the reset transistor 200 and a transfer transistor 220 are cascaded between a drive power source (power source voltage Vdd) and an output of the PD10, and a floating diffusion portion (hereinafter, referred to as an FD portion) 160 is provided between a source of the reset transistor 200 and a drain of the transfer transistor 220. Also, a selection transistor 240 and an amplifier transistor 260 are cascaded between the output signal line 120 and the power source voltage Vdd, and a gate of the amplifier transistor 260 is connected to the FD unit 160.

The reset transistor 200 is controlled by a set line 201, the selection transistor 240 is controlled by a selection line 241, and the transfer transistor 220 is controlled by a transistor line 221.

When reading a video signal, a reset pulse RDT is input to the gate of the reset transistor 200 via the set line 201, a transfer pulse TRS is input to the gate of the transfer transistor 220 via the transfer line 221, and a selection pulse SEL is input to the gate of the selection transistor 240 via the selection line 241.

In the above configuration, when the selection transistor 240 is turned on, the amplifier transistor 260 and a constant current source 140 outside of the image pickup unit form a source follower. Therefore, a voltage of the output signal line 120 becomes a value following to a gate voltage of the amplifier transistor 260, that is, a voltage of the FD portion 160. This value regulates an output of a pixel (a pixel signal level).

FIG. 2A to FIG. 2E are timing charts at reading a pixel signal.

Here, a transfer pulse TRS shown in FIG. 2A, a reset pulse RST shown in FIG. 2B, and a selection pulse SEL shown in FIG. 2C has a high level of a power source voltage Vdd and a low level of a reference voltage Vss (for example, a ground voltage). Therefore, transistors to be applied with the respective pulses turn on in a process that a voltage of the pulse applied to the gate reaches a level near the power source voltage Vdd. FIG. 2D and FIG. 2E show voltage changes of the FD portion 160 and output signal line 120 (refer to FIG. 1). In the figures, a value of a voltage itself between the power source voltage Vdd and the reference voltage Vss is determined at certain time even when the value changes over time. On the other hand, a voltage of the FD portion 160 before time T1 and after time T3 indicated as hatched portions in FIG. 2D is "uncertain" between the power source voltage Vdd and the reference voltage Vss.

Before reading a pixel signal, that is, before the time T1 shown in FIG. 2E, all of the four transistors 200, 220, 240 and 260 shown in FIG. 1 are turned off, and a voltage V0 of the output signal line 120 is held at the power source voltage Vdd.

When one pixel row is selected in this state, a selection line 241 corresponding to the pixel row (refer to FIG. 1) is applied with a selection pulse SEL shown in FIG. 2C. At the time T1 being approximately the same time as rising of the selection pulse SEL, a reset line 201 of the selected pixel row becomes active and a reset pulse RST rises as shown in FIG. 2B. Consequently, the reset transistor 200 shown in FIG. 1 turns on, and as shown in FIG. 2D, a voltage of the FD portion 160 having been uncertain until then becomes a high-level voltage (hereinafter, referred to as a reset voltage) V10, which is lower than the power source voltage Vdd exactly by a predetermined voltage, due to an effect by the reset transistor 200. Since the selection transistor 240 shown in FIG. 1 is already turned on, as shown in FIG. 2E, a voltage V0 of the output signal line 120 changes to a voltage V11, which is lower exactly by a differential voltage ΔV (hereinafter, referred to as a reset read voltage). Due to effects by the amplifier transistor 260 and the selection transistor 240 shown in FIG. 1, the reset read voltage V11 becomes a voltage between the power source voltage Vdd and the reference voltage Vss, which is normally furthermore lower than the above reset voltage V10. The differential voltage ΔV is a voltage determined comprehensively by the reset transistor 200, the amplifier transistor 260, a coupling capacitance thereof and the FD portion 160 and, furthermore, the selection transistor 240, etc.

When the transfer line 221 (refer to FIG. 1) becomes active, at the time T2 after a sufficient time for the reset read voltage V11 to become stabilized as shown in FIG. 2A, the transfer pulse TRS rises. Consequently, the reset transistor 200 shown in FIG.1 turns on, electrons accumulated in the photodiode 100 from a certain time after previous reading until then are transferred to the FD portion 160, and a potential of the FD portion 160 declines (a voltage V20). The decline of the potential is transferred to the output signal line 120 via the amplifier transistor 260 and the selection transistor 240 in turned on states. As a result, a voltage of the output signal line 120 furthermore declines from the reset read voltage V11 as shown in FIG. 2E exactly by an amount according to a charge amount (received light amount) of the electrons transferred to the FD portion 160 and becomes a voltage V21 (hereinafter, referred to as a pixel read voltage) in accordance with the received light amount of the photodiode 100.

Then, after the pixel read voltage V21 becomes stabilized, the application of the transfer pulse TRS finishes (FIG. 2A). When the selection pulse SEL falls at the T3 after a predetermined time after that, as shown in FIG. 2C, a voltage of the FD portion 160 again becomes "uncertain" as shown in FIG. 2D.

After finishing the selection pulse SEL, a signal is output to outside of the sensor via the column processing circuit (not shown).

The above operation is repeated at predetermined cycles in units of each pixel row, and a video signal having level information in accordance with one picked-up image can be read from the successively output pixel signals.

As in the operation example explained above, a voltage of the output signal line changes to some levels when reading a pixel signal.

During a period, wherein a pixel row is selected and a selection pulse SEL is active, first, a reset read voltage (V11 in the example in FIG. 2E) appears in the output signal line 120. However, a voltage of the output signal line before that is the power source voltage Vdd, the reference voltage Vss or floating (the power source voltage Vdd in the example in FIG. 2E). The reset read voltage V11 is normally a voltage being lower than the power source voltage Vdd exactly by a differential voltage ΔV determined comprehensively by transistors in pixels and the production process as explained above but is higher than the reference voltage Vss.

Therefore, when shifting from the power source voltage Vdd or the reference voltage Vss to the set read voltage V11, it requires a certain time. When the initial state of the output signal line is floating, it may be a level close to the power source voltage Vdd or the reference voltage Vss, so that approximately the same time has to be estimated.

The time required for the voltage shift relates to a load on the output signal line 120 (a parasitic capacitance and resistance) and a drive ability of the amplifier transistor 260. Since the number of pixels in an image pickup device is increased recently, a load on the output signal line 120 is also increased thereby. Therefore, it takes time for a potential of the output signal line 120 to become stable and an interval between the time T1 and time T2 in FIG. 2 has to be long, which may result in a decline of the operation speed.

Also, when the initial state is floating, the initial voltage of the output signal line 120 depends on a pixel signal level at the time reading in the previous pixel row finishes (the time T3 in FIG. 2E). As a result, the initial voltage of the output signal line 120 fluctuates according to each pixel rows and columns, so that when an interval between the time T1 and time T2 is short, the fluctuation of the initial voltage easily becomes noise for the video signal.

SUMMARY OF THE INVENTION

It is desired to control a voltage of the output signal line provided for each pixel row of an image pickup device to be a suitable value for a high-speed operation.

According to the present invention, there is provided a image pickup device, wherein output signal lines are connected respectively to one of pixel columns in an image pickup unit having pixels arranged in arrays, and a voltage supply circuit for supplying a voltage between the power source voltage and a reference voltage is connected to the output signal lines.

According to the present invention, there is provided a image pickup device, wherein output signal lines are connected respectively to one of pixel columns in an image pickup unit having pixels arranged in arrays, a reset voltage is output to the output signal lines, and a pixel signal is read to the output signal lines in a state that the reset voltage is output; and a voltage supply circuit for supplying to the output signal lines a predetermined voltage being equal to a voltage of the outputs signal lines in a state that the reset voltage is output before the reset voltage is output is provided.

In the present invention, preferably, the voltage supply circuit includes a short circuit for switching electric connection and disconnection of all output signal lines.

Preferably, the voltage supply circuit includes a voltage generation means for generating from a power source voltage a lower predetermined voltage than the power source voltage and a switch for controlling supply of the predetermined voltage to the output signal lines.

In the image pickup device, for example, a reset voltage is set, the reset voltage is output to the output signal line, and a pixel signal is read (discharged) to the output signal line in that state in a pixel in the image pickup unit.

According to the above configuration, for example, the power source supply circuit supplies a voltage between the power source voltage and a reference voltage to an output signal line prior to the outputting of the reset voltage. Therefore, in the present invention, a voltage of the output signal line shifts from a level closer to the reset voltage level than to the power source level of the power source voltage or reference voltage to the reset voltage.

According to the present invention, a voltage of an output signal line provided to each pixel row of an image pickup device can be controlled to be a suitable value for a high-speed operation.

BRIEF DESCRIPTION OF DRAWINGS

These and other objects and features of the present invention will become clearer from the following description of the preferred embodiments given with reference to the attached drawings, in which.

DESCRIPTION OF THE PREFERRED EMBODIMENT

The present embodiment can be applied widely to a so-called X-Y address type solid-state image pickup device, wherein a pixel signal is read to an output signal line. There is a CMOS image sensor as a typical solid-state image pickup device as such. Below, a CMOS image sensor is taken as an example for explaining the present embodiment.

Figure 3:
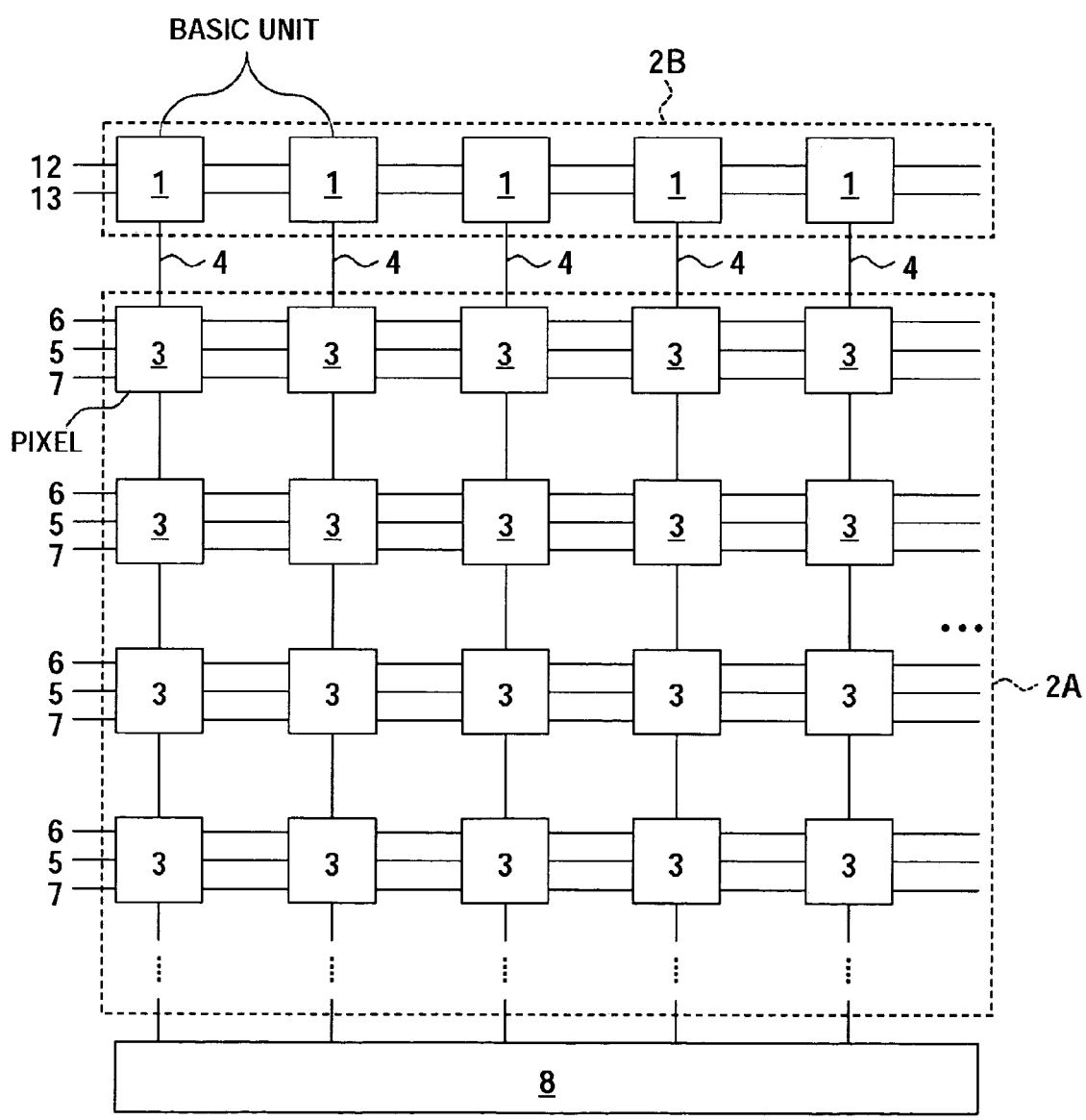
FIG. 3 is a block diagram of the main configuration of a CMOS image sensor to which the present invention is applied.
Figure 4:
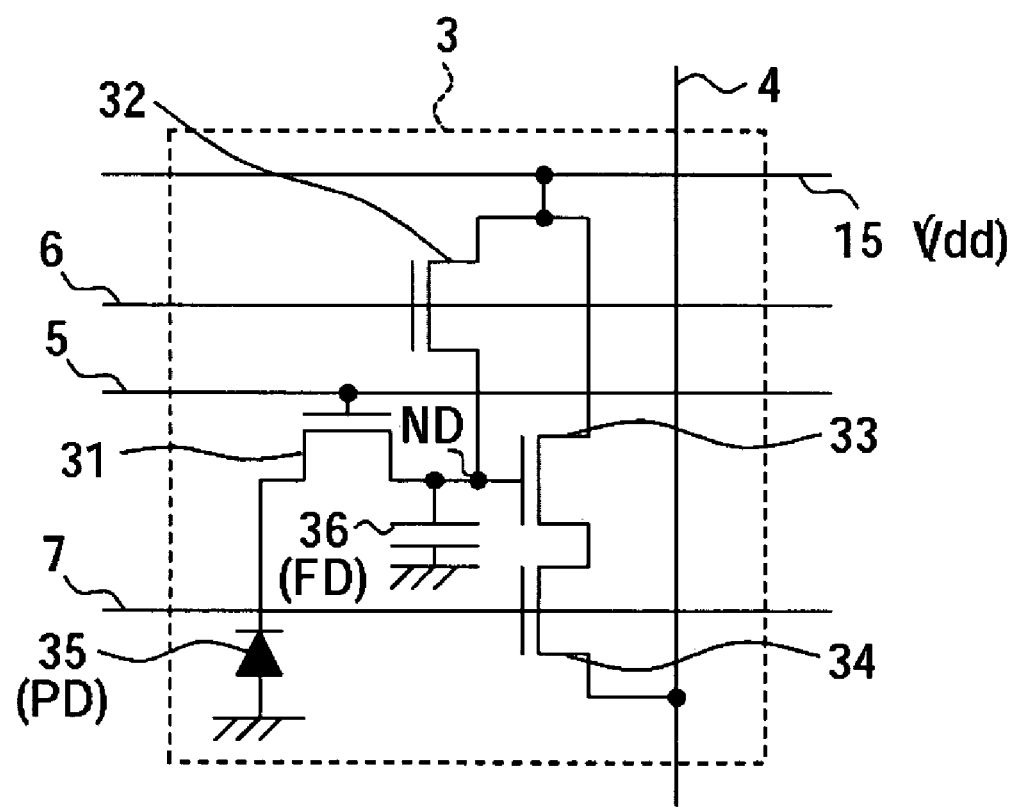
FIG. 4 is a circuit diagram of pixels.

FIG. 3 is a view of the main configuration of a CMOS image sensor in the present embodiment. FIG. 4 is a circuit diagram of pixels. Note that supply lines (power source lines) of a power source voltage Vdd and a reference voltage Vss are omitted in FIG. 3.

The CMOS image sensor 2 shown in FIG. 3 has an image pickup unit 2A having pixels 3 arranged in matrix. The image pickup unit 2A normally has a valid pixel region and a light-shielded pixel region, however, it basically has identical or similar (a valid pixel and a light-shielded pixel are similar) pixels 3 arranged regularly.

In the case of the four-transistor type as shown in FIG. 4, each pixel 3 has a photodiode (PD) 35 for performing photoelectric conversion on an input light and four transistors 31 to 34.

An anode of the PD 35 is connected to a supply line of the reference voltage Vss (a ground voltage in the figure), and a cathode thereof is connected to a source of a transistor 31.

The transistors are a reset transistor 32, a transfer transistor 31, an amplifier transistor 33 and a selection transistor 34. The reset transistor 32 switches a node ND of a floating diffusion portion (hereinafter, referred to as an FD portion) 36 from a floating state to a connected state to a power source voltage line 15 as a supply line of a power source voltage (hereinafter, referred to as Vdd), charges the node ND with the power source voltage Vdd, and resets the charges. The transfer transistor 31 transfers accumulated charges (electrons in the present example) of the photodiode PD to the node ND being in a floating state again after the reset. The amplifier transistor 33 amplifies a pixel signal according to the accumulated charges transferred to the node ND. The selection transistor 34 controls outputting from the amplifier transistor 33 to the output signal line 4.

A gate of the reset transistor 32 is connected to a reset line 6 shared by pixels on the same line. A gate of the transfer transistor 31 is connected to a transfer line 5 shared by pixels on the same line. A gate of the selection transistor 34 is connected to a selection line 7 shared by pixels on the same line.

As shown in FIG. 3, the CMOS image sensor 2 is provided with a column processing circuit 8 for performing parallel processing on pixel signals output at a time to the output signal line 4 to remove noise therefrom.

Figure 1:
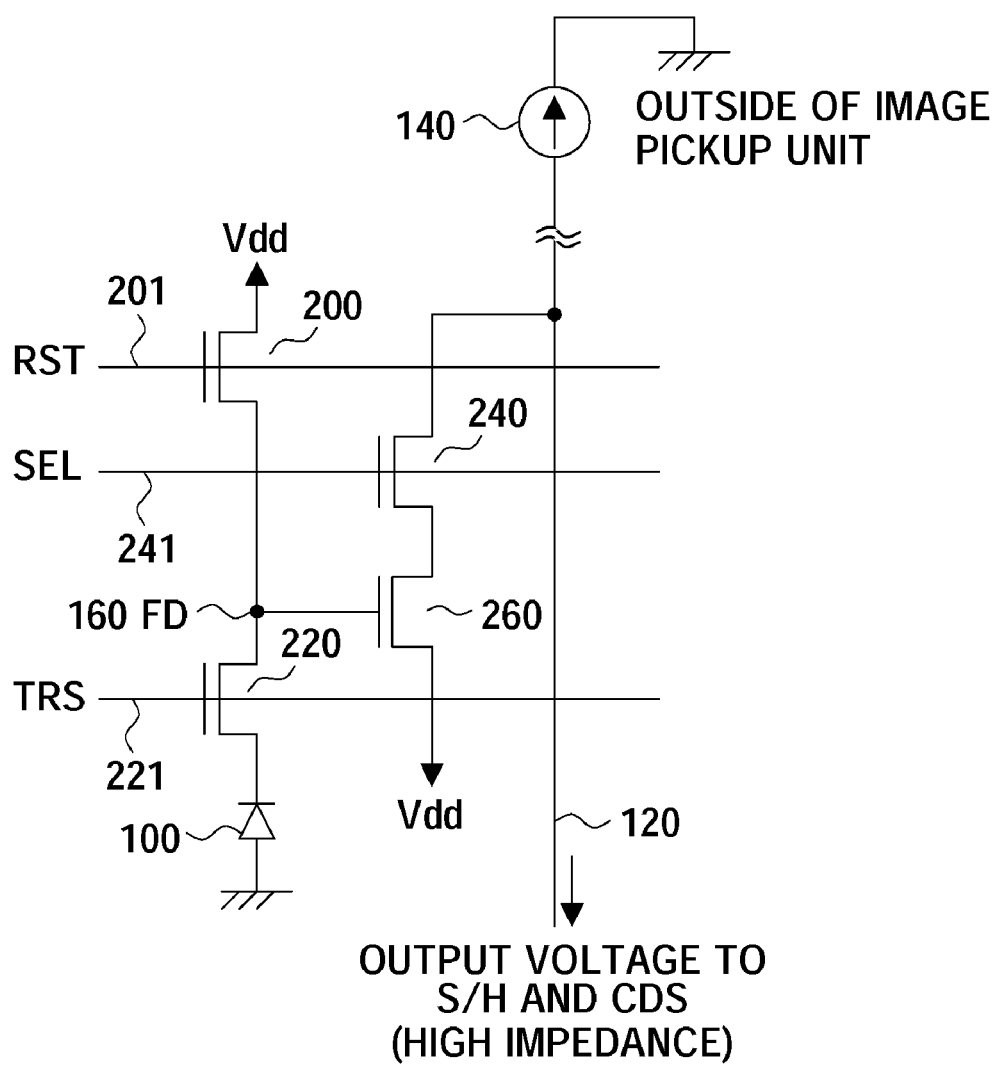
FIG. 1 is a circuit diagram of pixels in the related art.

While not illustrated in FIG. 3, each of the variety of control lines (reset lines 6, transfer lines 5 and selection lines 7) and power source voltage lines 15 (refer to FIG. 4) is connected to a vertical drive circuit for supplying a variety of signals to that. Also, in the same way as in FIG. 1, a current source (not shown) for supplying a constant current to the amplifier transistor 33 is provided for each output signal line 4.

Operations of the column processing circuit 8, the vertical drive circuit and the current source are controlled by a not shown timing control circuit provided in the CMOS image sensor 2.

Note that the pixels 3 are not limited to the four-transistor type and may be, for example, a three-transistor type, wherein the selection transistor 34 is omitted.

In the present embodiment, as shown in FIG. 3, a voltage supply circuit 2B is connected to the output signal line 4. The voltage supply circuit 2B in FIG. 3 positions on the opposite side of the column processing circuit 8, but it may be provided between the column processing circuit 8 and the image pickup unit 2A or on both sides in the wiring direction of the output signal line 4.

The voltage supply circuit 2B is for setting a voltage of the output signal line 4 to be a voltage between the power source voltage Vdd and the reference voltage Vss in advance when outputting a reset voltage prior to reading of a pixel signal. Below, a variety of configuration examples of the voltage supply circuit 2B and operations thereof will be explained.

FIRST EXAMPLE 1

A first example 1 corresponds to the case where a basic unit 1 of the voltage supply circuit 2B is connected to each output signal line 4.

Figure 5:
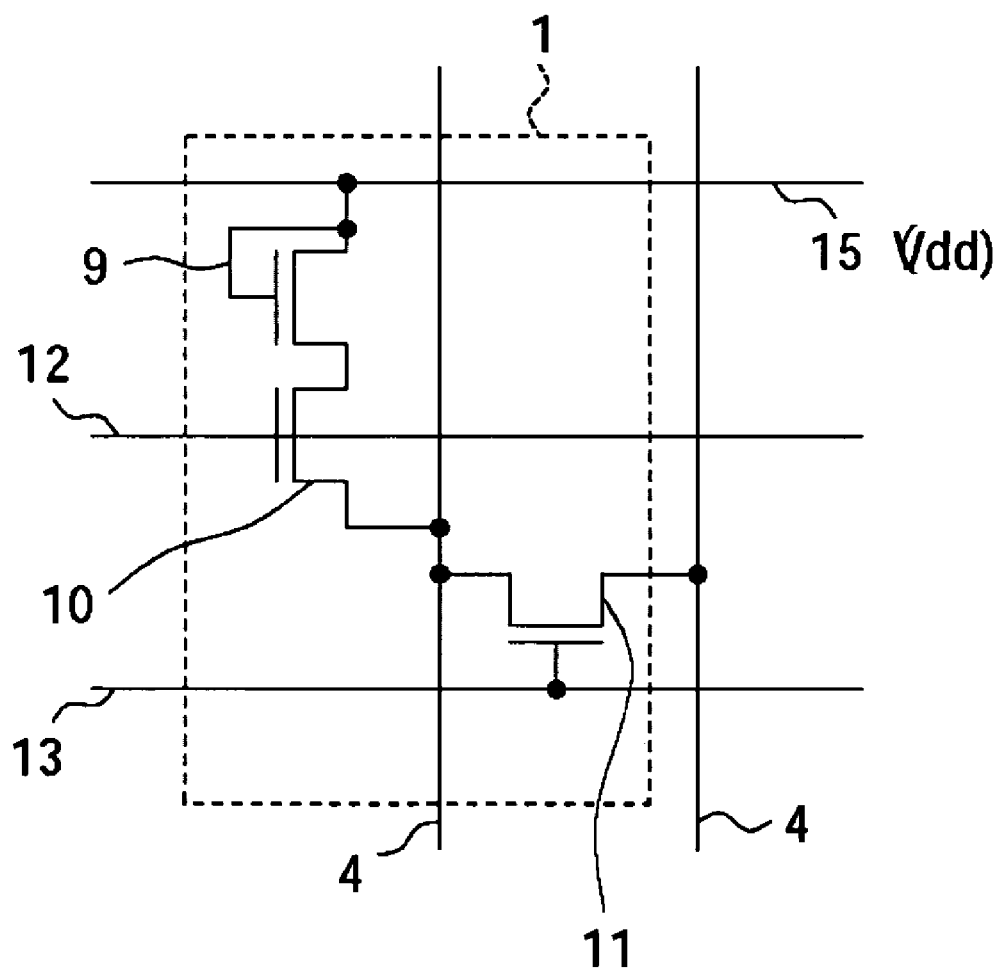
FIG. 5 is a circuit diagram of a basic unit of a voltage supply circuit in a configuration example 1.

The basic unit 1 of the voltage supply circuit in the configuration example 1 has, as shown in FIG. 5, a voltage generation transistor 9 as a voltage generation means, a switch transistor 10 and a short-circuiting transistor 11. A gate and drain of the voltage generation transistor 9 are connected to the power source voltage line 15 and are diode-connected. Therefore, a source voltage of the voltage generation transistor becomes a "power source voltage—Vt" or so. Here, "Vt" is a threshold voltage of the voltage generation transistor 9 and the "power source voltage—Vt" is a voltage obtained by so-called "threshold lowering" from the power source voltage. The voltage is supplied to the output signal line 4 via a switch transistor 10.

On the other hand, a short-circuiting transistor 11 is a means for causing short circuit between adjacent output signal lines 4 and 4 and is an element for composing a "short circuit" in the voltage supply circuit 2B as a whole shown in FIG. 3. The short-circuiting transistor 11 is additional as a function of voltage supplying and may be omitted. Note that since a threshold voltage of a transistor generally varies, the voltage "power source voltage—Vt" also varies more or less in each output signal line 4. The short-circuiting transistor 11 and a short circuit including the same are preferably added to a voltage supply circuit 2B to eliminate the fluctuation.

A gate of the switch transistor 10 is connected to a switch control line 12 shared by respective switch transistors in basic units 1 arranged in the line direction. A gate of the short-circuiting transistor 11 is connected to a short-circuit control line 13 shared by respective short-circuiting transistors in basic units 1 arranged in the line direction.

FIG. 6A to FIG. 6C show an example of timing charts of the basic unit of the voltage supply circuit. FIG. 6A shows a chart of a switch pulse S12 to be supplied to the switch control line 12, FIG. 6B shows a chart of a short-circuit pulse S13 to be supplied to the short-circuit control line 13, and FIG. 6C shows a chart of voltage changes of the output signal line 4 in response to their pulse supply. Here, a high level of the pulses S12 and S13 is the power source voltage Vdd and a low level thereof is the reference voltage Vss.

Voltage supply to the output signal line 4 is for controlling an output signal line voltage at outputting a reset voltage when reading a pixel signal to the output signal line 4 in a state that a reset voltage is output to the output signal line 4.

Figure 6:
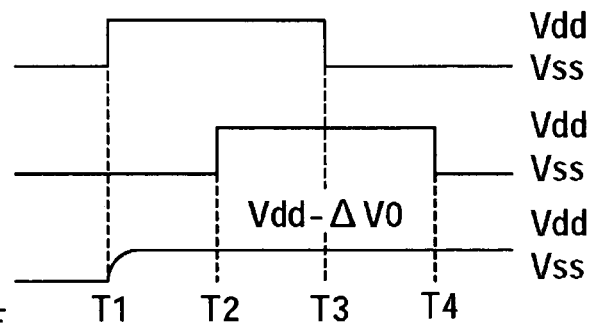
FIG. 6A to FIG. 6C are timing charts of an operation of a basic unit in the configuration example 1.

An output signal line voltage before the time T1 in FIG. 6 may be any of the power source voltage Vdd, the reference voltage Vss and a floating state (unfixed). FIG. 6 shows the case where the output signal line voltage is the reference voltage Vss at this time.

As shown in FIG. 6A, when a switch pulse S12 is applied to the switch line 12 connected to the gate of the switch transistor 10 at the time T1, the switch transistor 10 turns on. As a result, a source voltage "Vdd−Vt" of the voltage generation transistor 9 is output to the output signal line 4 through the turned on switch transistor 10. Therefore, a voltage of the output signal line 4 rises as shown in FIG. 6C and reaches a predetermined voltage "Vdd−ΔV0". This predetermined voltage is approximately the same as the source voltage "Vdd−Vt", but is a little lower than the source voltage due to an effect of on resistance, etc. Namely, a differential voltage ΔVt from the predetermined power source voltage Vdd is mainly a threshold voltage Vt of the voltage generation transistor 9 added with an amount of a declined voltage, such as the on resistance, and the predetermined voltage more or less fluctuates for each output signal line 4.

To eliminate the fluctuation, as shown in FIG. 6B, a short-circuit pulse S13 is applied to the short-circuit control line 13 connected to the gate of the short-circuiting transistor 11 at the time T2. When this pulse arises, short-circuiting transistors 11 between adjacent output signal lines turns on all at once, consequently, all output signal lines 4 are equalized to have a same potential.

After that, when the switch pulse S12 turns off at the time T3 and the short-circuit pulse S13 turns off at the time T4, supply of the predetermined voltage to the output signal lines 4 finishes.

Figure 2:
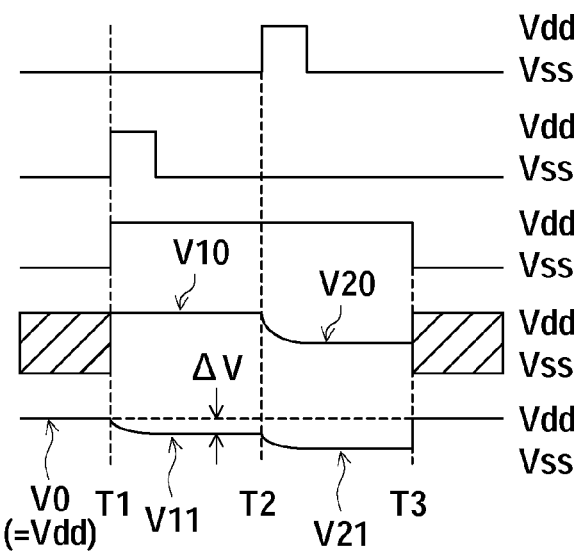
FIG. 2A to FIG. 2E are timing charts at reading a pixel signal in the related art.
Figure 7:
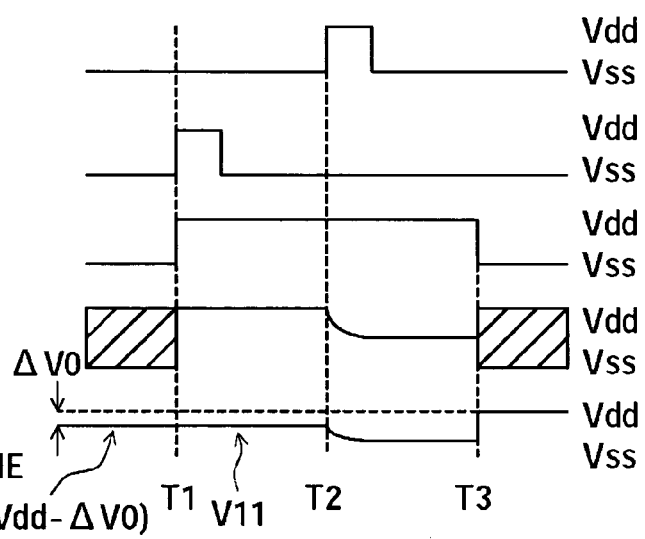
FIG. 7A to FIG. 7E are timing charts at reading a common pixel signal to respective examples.

FIG. 7E is a chart of voltage changes of an output signal line at reading a pixel signal including supply of the predetermined voltage to the output signal line. Note that controlling of supply of a transfer pulse TRS shown in FIG. 7A, a reset pulse RST shown in FIG. 7B and a selection pulse SEL shown in FIG. 7C and voltage changes of the FD portion shown in FIG. 7D were already explained with reference to FIG. 2, so that the explanation will be omitted here.

In FIG. 2E, a voltage V0 of the output signal line before the reset voltage outputting period T1 to T2 is the power source voltage Vdd, and a different between that and the reset read voltage V11 is ΔV or so, so that the voltage change takes time.

On the other hand, in FIG. 7E, a difference of the power source voltage Vdd and the reset read voltage V11 is ΔV1, and a voltage V0 of the output signal line before the time T1 is set to be a predetermined voltage "Vdd−ΔV0" in advance due to an operation of the voltage supply circuit 2B (refer to FIG. 3) explained above. In that case, the predetermined voltage V0 (=Vdd−ΔV0) to be supplied to the output signal line in advance is preferably the same or approximately same as the reset read voltage V11. The reset read voltage V11 is a voltage value determined comprehensively by the reset transistor 32, the amplifier transistor 33, a coupling capacitance thereof and the FD portion 36 and, furthermore, the selection transistor 34, etc. in the pixels 3 shown in FIG. 4. The reset read voltage V11 can be estimated to a certain extent by simulation when designing of the pixels and production process finish. Therefore, the basic unit 1 of the voltage supply circuit is designed, so that a differential voltage ΔV0 as an amount of a voltage decline becomes equal to the reset read voltage V11. In the case shown in FIG. 5, the differential voltage ΔV0 can be changed to a certain extent by mainly adjusting a threshold voltage Vt of the voltage generation transistor 9.

Note that, in FIG. 5, the configuration of omitting the voltage generation transistor 9, the switch transistor 10 and the control lines 12 may be also applicable. Such a configuration also gives an effect of reducing noise of a video signal as explained above.

As explained above, when the initial state is floating, an initial voltage of the output signal line depends on a pixel signal level at the time that reading of the previous pixel row finishes, as a result, the initial voltage of the output signal line varies for each pixel row and each pixel row, and the fluctuation easily becomes noise of a video signal when an output period of the reset voltage is short.

The noise reduction can be attained without a function of power source generation as far as a function of a short-circuiting transistor is provided, and fluctuation of every pixel row can be reduced thereby. An operation at this time is the case without a signal in FIG. 6A in FIG. 6.

Next, other configuration examples of the voltage supply circuit will be explained.

In these configuration examples, FIG. 3 can be applied by replacing the unit 1 in FIG. 3 by a basic unit having other configuration. Also, basics of reading timing of the pixel signal shown in FIG. 7A to FIG. 7E and the operation are basically the same as those in these other configuration examples. Therefore, explanation on FIG. 3 and FIG. 7 will be omitted, and difference of the voltage supply circuit and the operation (difference of the predetermined voltage value or equalizing method) will be mainly explained.

CONFIGURATION EXAMPLE 2

In the configuration example 2, a plurality of the voltage generation transistors in the configuration example 1 shown in FIG. 5 are provided.

Figure 8:
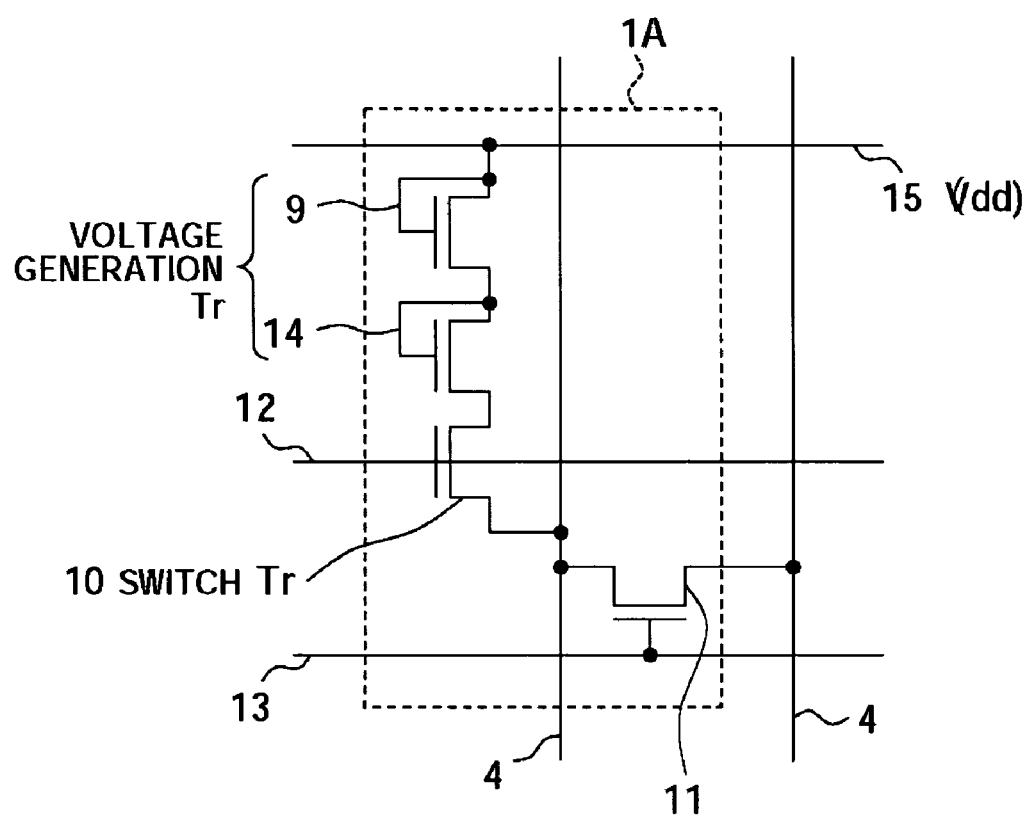
FIG. 8 is a circuit diagram of a basic unit in a configuration example 2.

FIG. 8 is a circuit diagram of a basic unit 1A in the configuration example 2. In FIG. 8, another voltage generation transistor 14 is provided between the voltage generation transistor 9 and the switch transistor 10 provided in FIG. 5. When threshold voltages Vt are same in the two voltage generation transistors 9 and 14, a predetermined voltage V0 supplied to the output signal line 4 becomes "power source voltage Vdd−2×Vt" or so.

In the configuration example 1, to furthermore lower the predetermined voltage V0, the threshold voltage Vt of the voltage generation transistor 9 has to be made large and it is highly possible that an additional process (ion implantation, etc.) becomes necessary only for this purpose.

On the other hand, when comparing FIG. 5 with FIG. 4, the basic unit 1 of the voltage supply circuit is small in scale comparing with that of the pixel circuit and there is a room in the region for forming a voltage supply circuit regulated by pitches of the output signal lines 4. Therefore, it is easy to add a voltage generation transistor as in the present example and there is not any area penalty.

From the above, the configuration example 2 has an advantage that the predetermined voltage V0 can be made lower without widening pitches of the output signal lines 4 and requiring any additional processes.

Note that the number of transistors to be added is not limited and two or more of them can be added. Also, a freedom degree of adjusting a differential voltage AVO is limited with multiples of the same threshold voltage Vt, so that when further highly accurate adjustment is desired, additional process becomes necessary or a voltage generation transistor having a different threshold voltage may be provided.

CONFIGURATION EXAMPLE 3

The configuration example 3 shows a modified example for equalizing.

Figure 9:
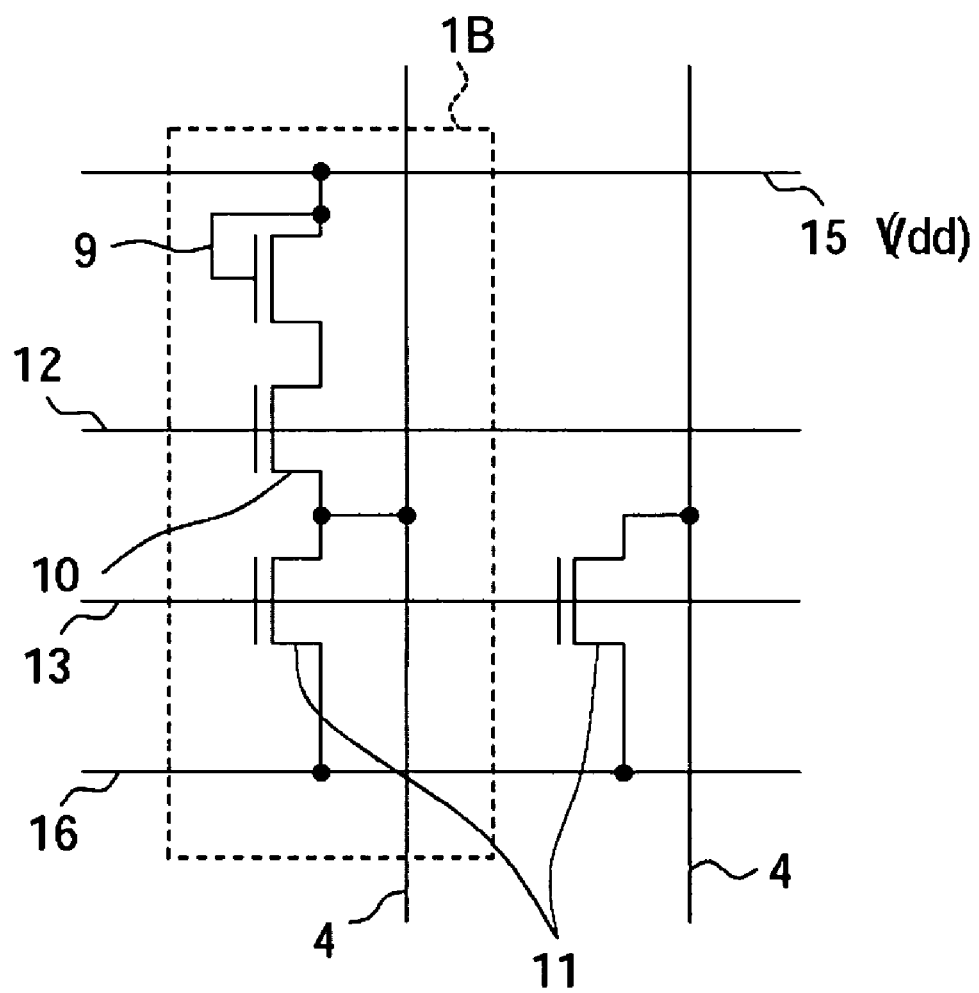
FIG. 9 is a circuit diagram of a basic unit in a configuration example 3.

FIG. 9 is a view of a basic unit 1B in the configuration example 3, which is a modified example of the configuration example 1 shown in FIG. 5.

In the basic unit 1B, a short-circuiting wire 16 is provided in common for basic units 1B in the line direction, and a short-circuit transistor 11 is not for connecting adjacent output signal lines 4 and is for controlling to connect the short-circuiting wire 16 respectively to the output signal lines 4. The short-circuiting transistor 11 is controlled by a short-circuiting control line 13 (refer to the short-circuiting pulse S13 in FIG. 6B) in the same way as in FIG. 5, and as a result that the short-circuiting transistors 11 turn on, potentials of all output signal lines 4 are equalized.

In the configuration example 3, a wiring space is additionally required comparing with the configuration example 1 and the configuration example 2, but since resistance of the wire is lower than the on resistance of the transistor, stability of a voltage of the output signal line can be improved when equalizing. Note that, in the configuration example 3, pitches of the output signal lines do not become wide.

Note that the configuration example 3 can be also applied to the case where a function of generating a voltage is omitted as explained in the configuration example 1.

CONFIGURATION EXAMPLE 4

In the configuration examples above, same circuits as basic units of the voltage supply circuit are connected to all output signal lines 4.

On the other hand, in the present configuration example 4, the basic units may be arranged regularly on every other output signal lines or every two or more output signal lines. Alternately, an irregular arrangement is also possible. In any case, it is sufficient if a ratio of output signal lines provided with the basic unit to output signal lines not provided with that is a predetermined value. The ratio is determined by a differential voltage $\Delta V0$ of a predetermined voltage $V0$ to be supplied to the output signal line 4 based on the power source voltage Vdd at reset outputting.

In that case, one basic unit can be arranged on a space corresponding to a plurality of pitches of the output signal lines 4, so that the area can be reduced. Note that since the supply ability of the predetermined voltage $V0$ may decline, time required by the voltage of the output signal line 4 to stably become the predetermined voltage $V0$ is longer than that in the configuration example 1, etc. However, the voltage stabilizing period is before or after a period of affecting reading speed of a pixel signal (time T1 to time T3 in FIG. 7), so that the reading speed of the CMOS sensor is not affected thereby.

Configuration examples 5 to 8 below are cases where basic units of a plurality of different configurations are provided as a means for supplying different voltage levels. In the explanation below, two levels, which are the power source voltage Vdd and the reference voltage Vss, are taken as examples of the voltage levels, but other voltage level may be also used or three or more levels may be used.

CONFIGURATION EXAMPLE 5

Figure 10:
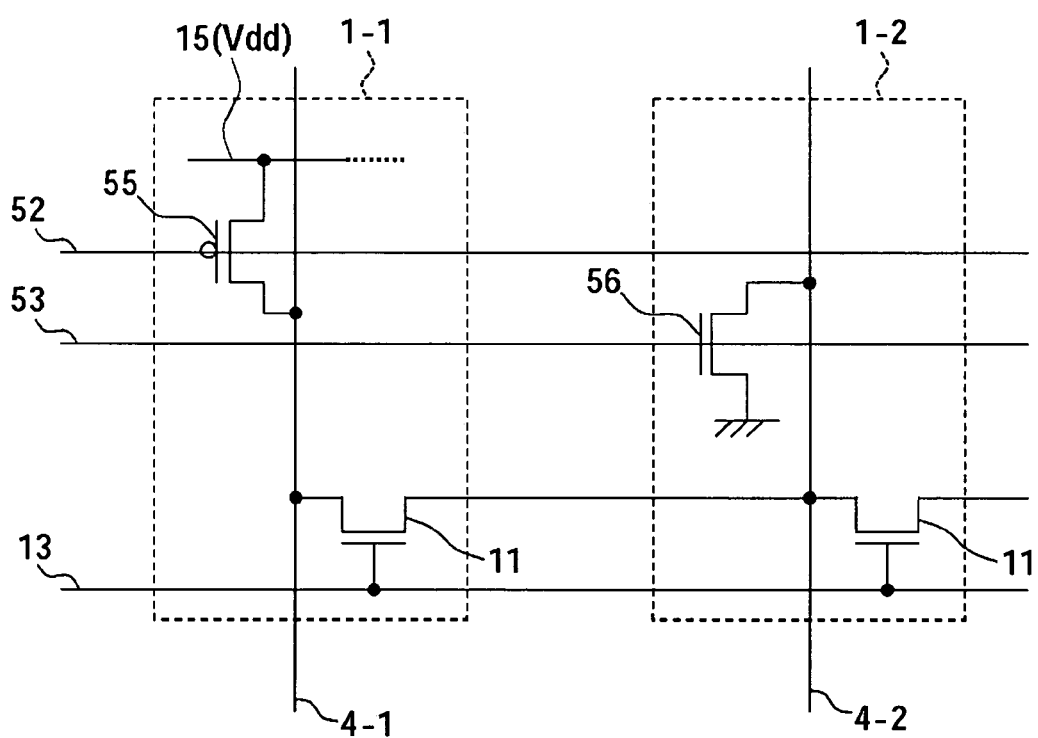
FIG. 10 is a circuit diagram of a basic unit in a configuration example 5.

FIG. 10 is a view of a circuit of a basic unit in the configuration example 5.

In the configuration example 5, the basic unit 1 shown in FIG. 3 is configured by alternately arranged first units 1-1 for outputting a high level and second units 1-2 for outputting a low level.

In the first unit 1-1, the voltage generation transistor 55 as a voltage generation means is connected between a power source voltage line 15 and the output signal line 4-1, and a switch transistor (refer to FIG. 5) is not provided. Also, in the second unit 1-2, the voltage generation transistor 56 is connected between the reference voltage Vss and an output signal line 4-2, and a switch transistor is not provided, either.

In the present configuration example, the first units 1-1 and the second units 1-2 are alternately arranged. The voltage generation transistor 55 is composed of a p-MOS transistor, and a gate thereof is controlled by a first control line 52. When composing the high-level side by a pMOS transistor as such, there is an advantage that so-called "threshold lowering" does not arise and a voltage not affected by a threshold voltage can be supplied to the output signal line 4-1.

The voltage generation transistor 56 is composed of an nMOS transistor, and a gate thereof is controlled by a second control line 53.

The short-circuiting transistor 11 is for causing short circuit between adjacent output signal lines, and a gate thereof is controlled by a short-circuiting control line 13

FIG. 11A to FIG. 11E show an example of timing charts of the basic unit of the voltage supply circuit of the configuration example 5. FIG. 11A is a chart of a pulse S52 to be supplied to the first control line 52, FIG. 11B is a chart of a pulse S53 to be supplied to the second control line 53, and FIG. 11C is a chart of a short-circuiting pulse S13 to be supplied to the short-circuiting control line 13. FIG. 11D and FIG. 11E show voltage changes of the output signal lines 4-1 and 4-2 in response to their pulse supply. Here, a high level of the pulses S52, S53 and S13 is the power source voltage Vdd and a low level thereof is the reference voltage Vss.

Figure 11:
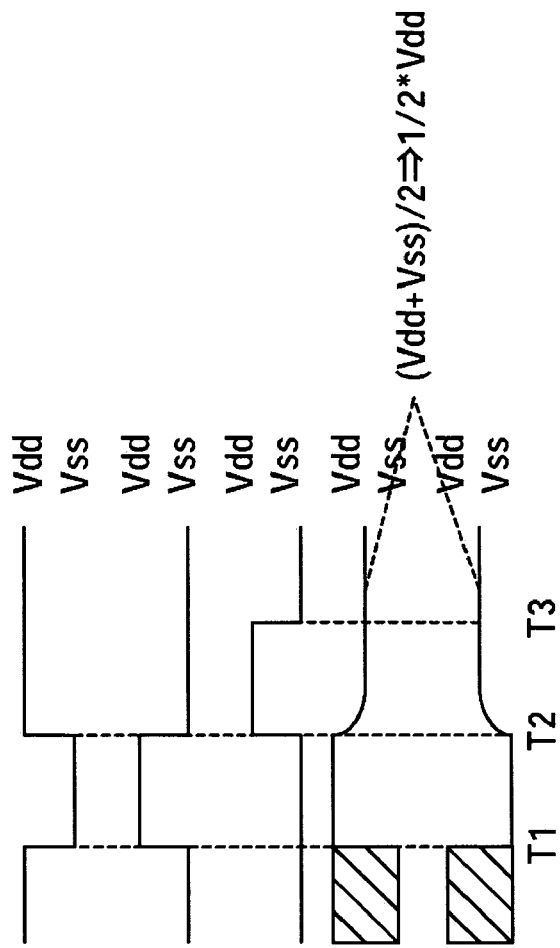
FIG. 11A to FIG. 11E are timing charts of an operation of the basic unit in the configuration example 5.

The output signal line voltage before the time T1 in FIG. 11 may be any of the power source voltage Vdd, the reference voltage Vss and a floating state (unfixed). FIG. 11 shows the "unfixed" case.

As shown in FIG. 11A and FIG. 11B, at the time T1, when the pulse S52 changes from the high level to the low level and the pulse S53 supplied to the second control line 53 changes from the low level to the high level, both of the pMOS transistor 55 and the nMOS transistor 56 turn on. As a result, as shown in FIG. 11D and FIG. 11E, the output signal line 4-1 becomes the power source voltage Vdd and the output signal line 4-2 becomes the reference voltage Vss.

As shown in FIG. 11A and FIG. 11B, the pulse S52 on the first control line 52 turns off and the pulse S53 on the control line 53 turns off at the time T2. Thereby, the output signal lines 4-1 and 4-2 become to be in a floating state.

At the same time therewith, the short-circuiting pulse S13 on the short-circuiting control line 13 shifts from the low level to the high level. Thereby, the output signal line 4-1 and the output signal line 4-2 are electrically short-circuited and, when parasitic capacitances are the same in the respective wirings, both vertical signal voltages, that is, voltages of all output signals become stable at an intermediate value of the power source voltage Vdd and the reference voltage Vss "½×Vdd". This voltage is the predetermined voltage $V0$ in FIG. 7E and, in that case, a differential voltage $\Delta V0$ based on the power source voltage Vdd is also "½×Vdd".

After that, when the short-circuiting pulse S13 turns off at the time T3, supply of a predetermined voltage to the output signal line finishes.

CONFIGURATION EXAMPLE 6

Figure 12:
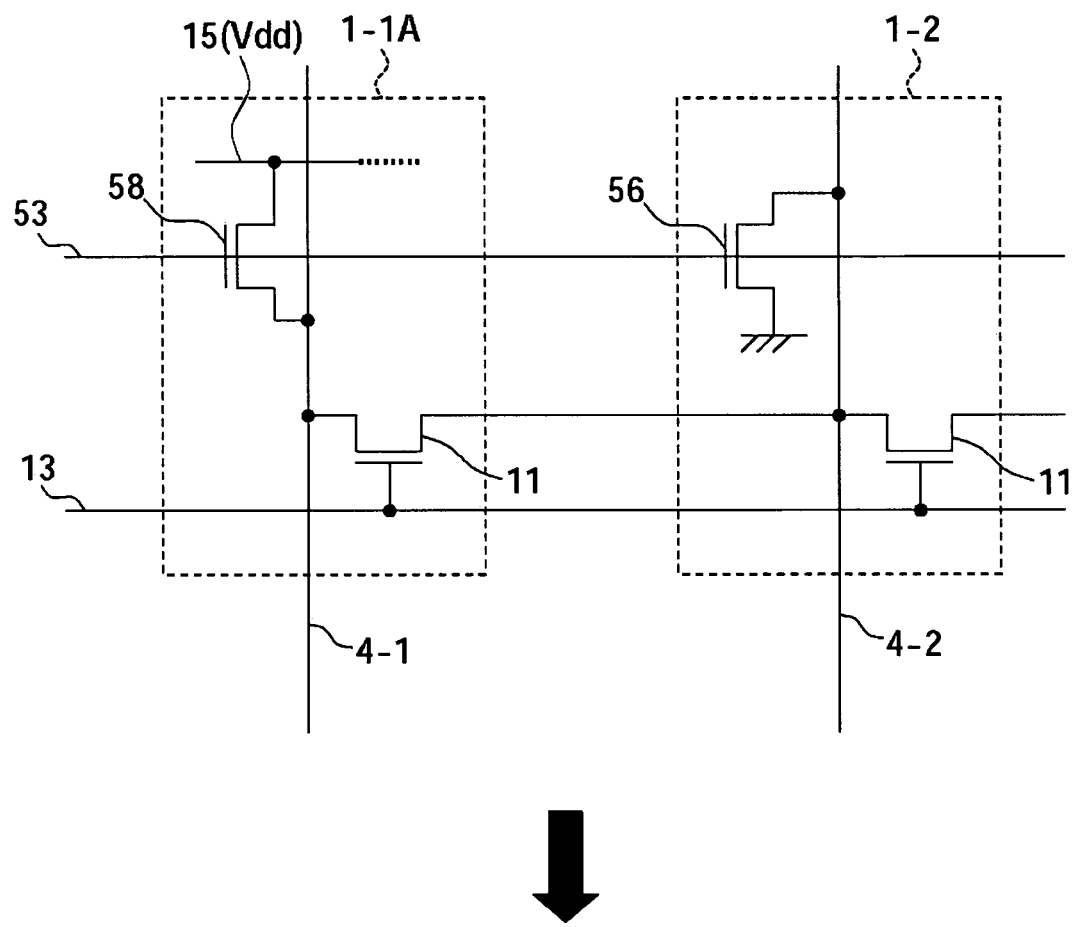
FIG. 12 is a circuit diagram of a basic unit of a configuration example 6.

FIG. 12 is a view of a circuit of a basic unit in the configuration example 6.

In the configuration example 6, when comparing with the configuration example 5 shown in FIG. 10, the voltage generation transistor 58 of the first unit 1-1A for outputting a high-level voltage is an nMOS transistor. Other configuration is the same as that in the configuration example 5.

In the configuration example 6, all of transistors in the voltage supply circuit and image pickup unit can be configured only by nMOS transistors, so that they can be formed in one well (p-well) and the layout design is easy. Also, in that case, a control line may be shared by the voltage generation transistors 58 and 56 in the first and second units, so that an area occupied by the voltage supply circuits can be reduced by that amount.

The operation timing is the same as that shown in FIG. 11B to FIG. 11E. Note that even if the high-level voltage of the pulse S53 to be supplied to the control line 53 is the power source voltage Vdd, when assuming there is little time after the time T2 in FIG. 11E until rising of the short-circuiting pulse S13, the output signal line 4-1 dose not rise to the power source voltage Vdd during that time, and the voltage is saturated at "Vdd−Vt", which is so-called threshold omitted value. As a result, a predetermined voltage V0 obtained by applying the short-circuit pulse S13 becomes "½×(Vdd−Vt)" as shown in FIG. 12.

Note that the voltage supply circuit 2B (refer to FIG. 3) can be formed only by the first unit 1-1A without using the second unit 1-2. In that case, in the same way as in the configuration example 1, the predetermined voltage V0 becomes stable at "Vdd−Vt".

The configuration examples 5 and 6 explained above obtain a desired voltage value by alternately arranging the first units and second units that generate different voltages and equalizing the different voltages. However, a voltage value obtained by that configuration is limited. Namely, a voltage value obtained in the configuration example 5 is "½× Vdd" and that obtained in the configuration example 6 is "½×(Vdd−Vt)" or "Vdd−Vt", which are lower.

Thus, by developing the idea and variously changing the ratio of the numbers of the first and second units, predetermined voltages can be generated more. Moreover, when the number of basic unit kinds (kinds of voltage generation transistor for generating different voltages) is increased by three or more, the number of predetermined voltages furthermore increases. An arrangement of the plurality of kinds of basic units is preferably regular when considering easiness in equalizing, but a part thereof may be irregular. Generation of predetermined voltages can be also attained by a random arrangement.

A condition to be satisfied by the voltage supply circuit for that purpose is "each of all output signal lines is set to any one of a plurality of voltage levels (a plurality of kinds of voltage generation transistors are provided". A group of the plurality of kinds of voltage generation transistors will be called "a voltage level set circuit".

Below, only one specific example will be explained as a configuration example 7.

CONFIGURATION EXAMPLE 7

Figure 13:
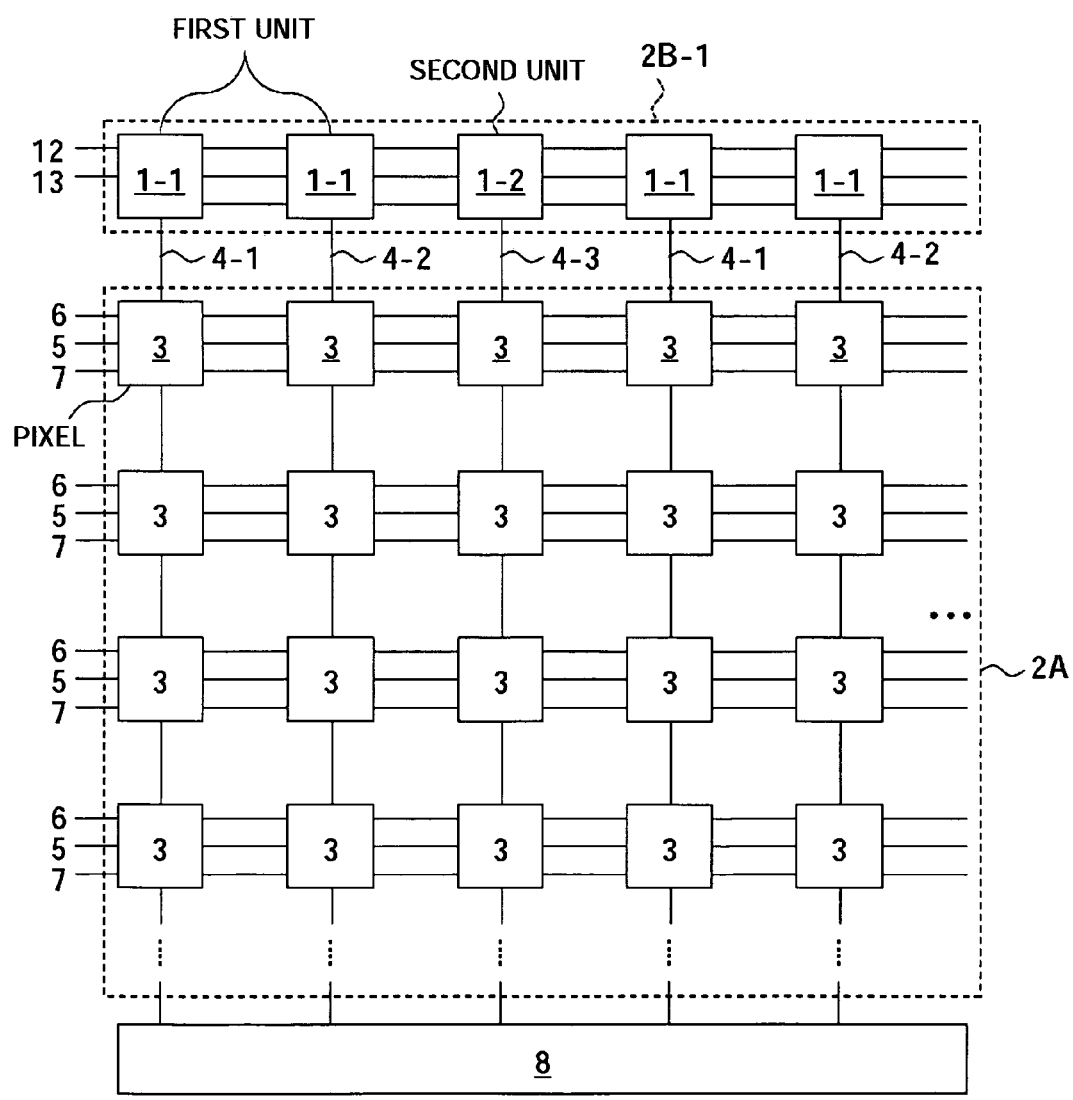
FIG. 13 is a block diagram showing a CMOS image sensor of a configuration example 7.

FIG. 13 is a view of a CMOS image sensor of the configuration example 7.

In a voltage supply circuit 2B-1 in the configuration example 7, two first units 1-1 being same as that in the configuration example 5 are arranged successively, the second units 1-2 being same as that in the configuration examples 5 and 6 is arrange next to them, and this arrangement is repeated. Other configuration is the same as that in FIG. 3.

Note that, in FIG. 13, the output signal line connected to the first unit 1-1 on the left is indicated by the reference number "4-1", the output signal line connected to the first unit 1-1 on the right side is indicated by the reference number "4-2", and the output signal line connected to the second unit 1-2 is indicated by the reference number "4-3".

Figure 14:
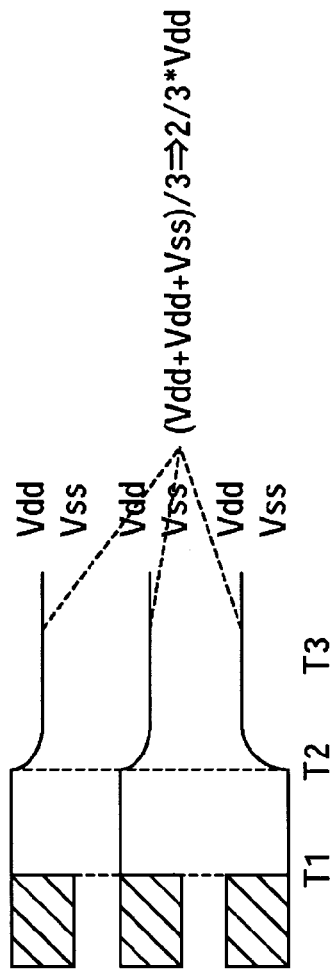
FIG. 14A to FIG. 14C are timing charts of an operation of the basic unit in the configuration example 7.

FIG. 14A to FIG. 14C shows an example of timing charts of a basic unit of a voltage supply circuit of the configuration example 7. Note that, in the configuration example 7, the first unit may be the same as that in the configuration example 6. Here, FIG. 13, wherein the first unit is the same as that in the configuration example 5, will be explained.

Operation timing of pulse application is the same as that shown in FIG. 11A to FIG. 11C. FIG. 14A to FIG. 14C show voltage changes of the output signal lines 4-1, 4-2 and 4-3.

During time T1 to T2 as a pulse application period to the voltage generation transistor, the output signal lines 4-1 and 4-2 become the power source voltage Vdd and the output signal line 4-3 becomes the reference voltage Vss in accordance with the basic unit arrangement in FIG. 13. Therefore, voltages after being equalized at the time of being applied with a short-circuiting pulse (the time T3) becomes "(Vdd+ Vdd+Vss)/3=⅔×Vdd".

From the configuration example 7, one variation as a predetermined voltage was added. By variously changing kinds and combination ratio thereof, a selection range of the predetermined voltages becomes wide and, thus, as explained in the configuration example 1, the predetermined voltage V0 can be easily brought to be equal to the reset read voltage V11.

CONFIGURATION EXAMPLE 8

Short-circuiting of output signal lines by the short-circuiting transistor 11 in the configuration examples 5 to 7 can be caused via the short-circuiting wiring 16 (configuration example 8) in the same way as in FIG. 9 of the configuration example 3.

In the configuration example 8, room for wiring space becomes necessary comparing with the configuration examples 5 to 7, but since resistance of the wiring is lower than on resistance of the transistors, stability of voltages of the output signal limes at equalization can be improved. Note that, in the configuration example 8, output signal line pitches do not become wide.

In the configuration examples 1 to 8 explained above, for example, a predetermined voltage V0 may be supplied after the time T4 shown in FIG. 7E and the respective output signal lines may be fixed to the voltage. Also, the predetermined voltage VO was expressed as "Vdd−ΔV0", but the power source Vdd here is a power source voltage supplied from the outside and, in the case of a device using multiple power sources, a power source voltage at other level generated inside by the power source voltage Vdd may be used instead of the power source voltage Vdd.

Figure 15:
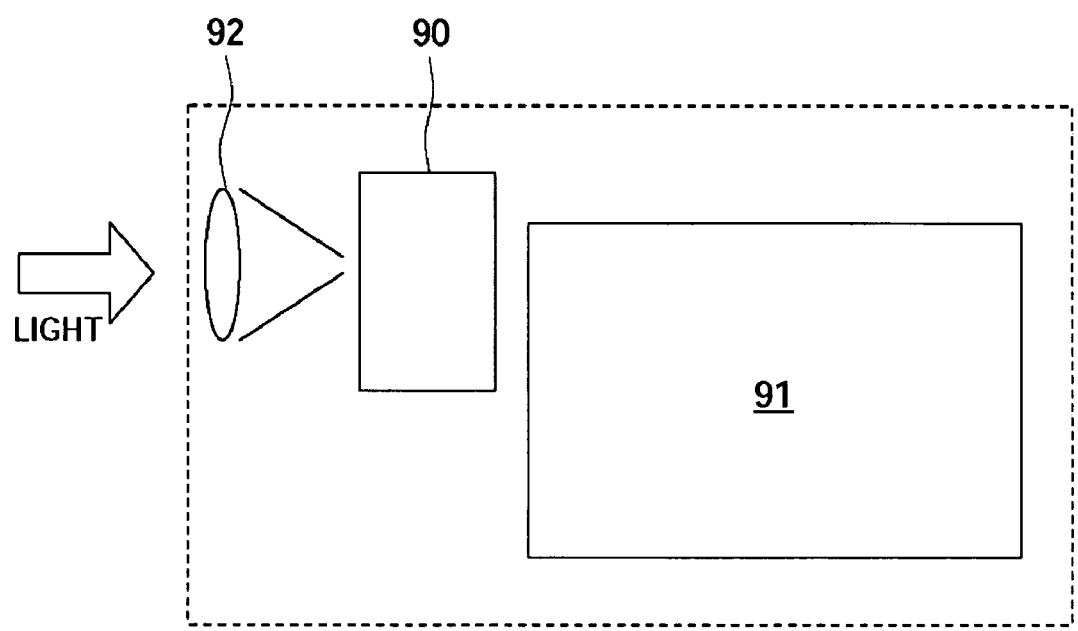
FIG. 15 is a view of the configuration of a camera device to which the present invention is applied.

Note that the present invention can be applied to a camera device (camera or a camera module) formed as an assembly of the CMOS image sensor 2 including the voltage supply circuit of the configuration examples 1 to 8, an optical system and other chips. In that case, the camera device may, as shown in FIG. 15, include a sensing unit 90 including a CMOS image sensor for image pickup, a signal processing unit 91 for performing signal processing and, furthermore, an optical system 92.

According to the present embodiment, in addition to the advantages explained in the respective configuration examples, the basic unit of the voltage supply circuit can be configured only by several transistors and, when changing the basic unit, the difference is little. Accordingly, in pattern designing of a device, the pattern designing of the voltage supply circuit is attained only by making these components a unit and registering as data, and arranging required kinds of basic units in accordance with required predetermined voltage at a necessary ratio. Furthermore, since a circuit of the basic unit is simple, the layout design is also easy. Therefore, designing of the device is easy and efficient. Also, since the basic unit can be formed basically by the same transistor (the size can be changed) as that in the pixel circuit, the production process of the device does not have to be changed or a little even if necessary.

Normally, to obtain a desired predetermined voltage accurately, a circuit capable of generating any voltage by an operational amplifier has to be provided.

On the other hand, in the present embodiment, a degree of freedom of setting a predetermined voltage can be made relatively high as in the configuration examples 1 to 8 without forming a complicated large-scale circuit as such. Therefore, realization of a high-speed operation can be sufficiently attained by reducing a time required by a voltage level shift of the output signal line.

Also, being different from a voltage generation circuit by an operational amplifier, the voltage supply circuit of the present embodiment is low at power consumption because all of a current from the power source via the circuit is used for charging the output signal lines.

As explained above, a high-speed image pickup device and a camera device easily designed and produced and requiring a small space can be realized by reducing a time for a voltage of an output signal line to become stable at reading a reset voltage by supplying a voltage to the output signal line at low power consumption.

It should be understood by those skilled in the art that various modifications, combinations, sub-combinations and alternations may occur depending on design requirements and other factors insofar as they are within the scope of the appended claims or the equivalents thereof.

What is claimed is:

1. An image pickup device, comprising:
    an image pickup unit having pixels arranged in arrays having pixel columns and pixel rows, the pixels being units configured for converting incident light into electrical signals;
    a plurality of output signal lines associated with at least one pixel column;
    a power source voltage line configured to supply a power source voltage;
    a voltage supply circuit coupled between said output signal lines and said power source voltage line, said voltage supply circuit configured to supply a voltage between the power source voltage and a reference voltage, said voltage supply circuit comprising a voltage generator coupled between said power source voltage line and at least one of said output signal lines and a voltage supply switch coupled between said voltage generator and said at least one output signal line;
    a voltage supply control line operatively coupled to said voltage supply switch; and
    a short-circuiting device coupled between said at least one output signal line and another output signal line, said short-circuiting device first effecting a connection between said output signal lines coupled thereto while said voltage supply circuit supplies said voltage between the cower source voltage and the reference voltage to said output signal lines and then effecting a disconnection between said output signal lines coupled thereto at least while a reset voltage for resetting said pixels and a pixel signal are output.

2. An image pickup device as set forth in claim 1, further comprising a short-circuiting control line operatively coupled to said short-circuiting device to control operation of said short-circuiting device, and
    a plurality of said short-circuiting devices are coupled to said short-circuiting control line.

3. An image pickup device as set forth in claim 2, wherein said short-circuiting device comprises a switch for selectively making and breaking an electrical connection between adjacent output signal lines.

4. An image pickup device as set forth in claim 1, wherein said voltage supply circuit is configured to generate voltage at a predetermined voltage that is lower than the power source voltage.

5. An image pickup device as set forth in claim 4, wherein a plurality of said voltage supply switches are coupled to said voltage supply control line.

6. An image pickup device as set forth in claim 4, wherein said voltage supply circuit comprises
    a cascaded circuit of said voltage generator and said voltage supply switch, connected to each of said output signal lines; and
    said short-circuiting device comprises a switch for selectively making and breaking an electrical connection of all output signal lines.

7. An image pickup device as set forth in claim 4, wherein said voltage generator comprises one or more predetermined number of diode-connected transistors.

8. An image pickup device as set forth in claim 1, wherein said voltage supply circuit comprises a voltage level set circuit for setting each of all output signal lines to any one of a plurality of voltage levels.

9. An image pickup device as set forth in claim 8, wherein said short-circuiting device comprises a switch for switching electric connection and disconnection between adjacent output signal lines.

10. An image pickup device as set forth in claim 1, wherein said voltage supply circuit has a switch for generating a voltage between the power source voltage and a reference voltage from a power source voltage supplied from the outside and outputting the voltage to said output signal line.

11. An image pickup device as set forth in claim 1, wherein said voltage supply circuit and said image pickup units are disposed on a common substrate, and each of the pixels and said voltage supply circuit include insulation gate type transistors.

12. An image pickup device, comprising:
    an image pickup unit having pixels arranged in an array with pixel columns and pixel rows;
    a plurality of output signal lines associated with one of said pixel columns in said image pickup unit;
    a voltage supply circuit configured to supply a predetermined voltage equal to a voltage of said output signal lines in a state that a reset voltage is output, and thereafter outputting to said output signal lines said reset voltage to regulate an initial state of reading a pixel signal to said output signal lines; and
    a short-circuiting device coupled between said at least one output signal line and another output signal line, said short-circuiting device first effecting a connection between said output signal lines coupled thereto while said voltage supply circuit supplies said predetermined voltage to said output signal lines and then effecting a disconnection between said output signal lines coupled thereto at least while a reset voltage for resetting said pixels and a pixel signal are output.

* * * * *